(12) United States Patent
McDonald et al.

(10) Patent No.: US 11,186,446 B2
(45) Date of Patent: Nov. 30, 2021

(54) PASSIVELY-OPERATED ACCUMULATION MODULE FOR USE WITH A POWERED CONVEYOR SYSTEM

(71) Applicant: Integrated Packaging Machinery, LLC, Rockford, MI (US)

(72) Inventors: Gavin Patrick McDonald, Sparta, MI (US); Johnathan David Burkhard, Saginaw, MI (US); Kyle Jason Bohmier, Shelby Charter Township, MI (US); Anthony Kammeraad, Byron Center, MI (US)

(73) Assignee: Integrated Packaging Machinery, LLC, Rockford, MI (US)

( * ) Notice: Subject to any disclaimer, the term of this patent is extended or adjusted under 35 U.S.C. 154(b) by 0 days.

(21) Appl. No.: 16/904,627

(22) Filed: Jun. 18, 2020

(65) Prior Publication Data

US 2021/0002083 A1 Jan. 7, 2021

Related U.S. Application Data

(60) Provisional application No. 62/869,805, filed on Jul. 2, 2019.

(51) Int. Cl.
| | |
|---|---|
| *B65G 47/32* | (2006.01) |
| *B65G 23/00* | (2006.01) |
| *B65G 23/06* | (2006.01) |
| *B65G 47/68* | (2006.01) |
| *B65G 47/26* | (2006.01) |
| *B65G 23/28* | (2006.01) |
| *B65G 47/51* | (2006.01) |

(52) U.S. Cl.
CPC ............. *B65G 47/32* (2013.01); *B65G 23/00* (2013.01); *B65G 23/06* (2013.01); *B65G 23/28* (2013.01); *B65G 47/268* (2013.01); *B65G 47/684* (2013.01); *B65G 47/5145* (2013.01); *B65G 2207/30* (2013.01)

(58) Field of Classification Search
CPC .... B65G 23/00; B65G 23/06; B65G 2207/30; B65G 47/5113; B65G 47/684; B65G 47/5145; B65G 15/06; B65G 47/268; B65G 23/24; B65G 23/28; B65G 23/30
USPC .............................. 198/453–455, 580, 347.4
See application file for complete search history.

(56) References Cited

U.S. PATENT DOCUMENTS

| | | | | |
|---|---|---|---|---|
| 3,604,551 A | * | 9/1971 | Fink .................... | B65G 47/5145 198/448 |
| 4,401,207 A | * | 8/1983 | Garvey ................ | B65G 47/684 198/347.4 |
| 7,222,718 B2 | * | 5/2007 | Tarlton ................. | B65G 47/684 198/347.4 |

(Continued)

FOREIGN PATENT DOCUMENTS

JP           61051415 A  *   3/1986   ........... B65G 47/684

*Primary Examiner* — Mark A Deuble
(74) *Attorney, Agent, or Firm* — Price Heneveld LLP

(57) ABSTRACT

According to one aspect of the present invention, an accumulation module for a product delivery system includes an input shaft configured to receive an external drive force. A transfer shaft reverses an operation of the external drive force to define a reversing drive force. An output shaft receives the reversing drive force. An accumulation belt is operated by the reversing drive force. The accumulation belt operates in opposition to the external drive force.

20 Claims, 10 Drawing Sheets

(56) References Cited

U.S. PATENT DOCUMENTS

| | | | |
|---|---|---|---|
| 9,714,144 B2 * | 7/2017 | Earling | B65G 47/5145 |
| 2005/0269186 A1 * | 12/2005 | Yoda | B65G 47/682 |
| | | | 198/455 |

* cited by examiner

| Second Drive Belt (FIG. 9) |||||
|---|---|---|---|---|
| Sprocket # | Function | # of Teeth | ω (rpm) | Torque (ft-lbf) |
| 1 | Output Sprocket | 24 | 15.8 | 17.72 |
| 2 | Idler | 17 | 22.3 | 0 |
| 3 | Transfer Sprocket | 12 | 31.6 | 8.86 |
| 4 | Idler | 17 | 22.3 | 0 |
| 5 | Tension Idler | 17 | 22.3 | 0 |
| First Drive Belt (FIG. 10) |||||
| Sprocket # | Function | # of Teeth | ω (rpm) | Torque (ft-lbf) |
| 1 | Take-off Sprocket | 12 | 94.9 | 2.95 |
| 2 | Tension Idler | 17 | 67.0 | 0 |
| 3 | Receiving Sprocket | 36 | 31.6 | 8.86 |

FIG. 7

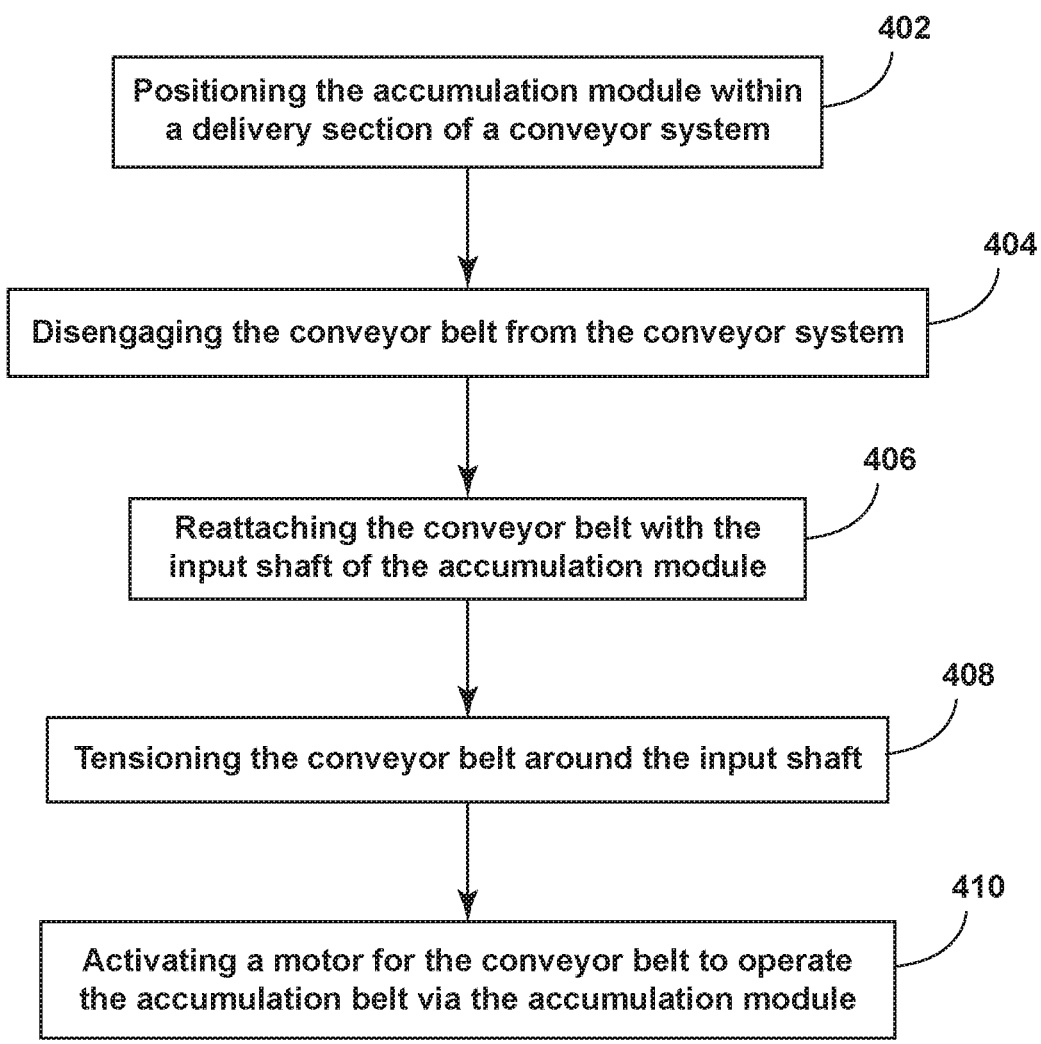

PASSIVELY-OPERATED ACCUMULATION MODULE FOR USE WITH A POWERED CONVEYOR SYSTEM

CROSS-REFERENCE TO RELATED APPLICATION

This application claims priority to and the benefit under 35 U.S.C. § 119(e) of U.S. Provisional Application No. 62/869,805, filed on Jul. 2, 2019, entitled PASSIVELY-OPERATED ACCUMULATION MODULE FOR USE WITH A POWERED CONVEYOR SYSTEM, the disclosure of which is hereby incorporated herein by reference in its entirety.

FIELD OF THE INVENTION

The present invention generally relates to conveyor systems, and more specifically, a passively-operated accumulation module that can be attached to a powered conveyor system.

BACKGROUND OF THE INVENTION

Within conventional conveyor systems, powered conveyors operate to transport products from one location to another. In certain instances, it is necessary to collect or accumulate sections of product. These systems that are commonly known as accumulation tables serve to temporarily store or recirculate products in certain areas of the conveyor system to prevent blockages and overloads within the conveyor system.

SUMMARY OF THE INVENTION

According to one aspect of the present invention, an accumulation module for a product delivery system includes an input shaft configured to receive an external drive force. A transfer shaft reverses an operation of the external drive force to define a reversing drive force. An output shaft receives the reversing drive force. An accumulation belt is operated by the reversing drive force. The accumulation belt operates in opposition to the external drive force.

According to another aspect of the present invention, a passively-operated accumulation module for a product delivery system includes an input shaft configured to receive an external drive force from a motor that drives a primary conveyor belt. A transfer shaft reverses operation of the external drive force to define a reversing drive force. A first belt extends around the input shaft and the transfer shaft. An output shaft receives the reversing drive force. A second belt extends around the transfer shaft and the output shaft. An accumulation belt is operated by the reversing drive force of the output shaft. The accumulation belt operates in opposition to the external drive force.

According to another aspect of the present invention, a method for attaching a passively-operated accumulation module to a product delivery system includes steps of positioning the accumulation module relative to a conveyor system, disengaging a primary conveyor belt of the conveyor system, attaching the primary conveyor belt to an input shaft of an accumulation module, tensioning the primary conveyor belt to achieve the desired wrapping of the primary conveyor belt with a power take-off sprocket of the accumulation module, and activating a motor of the primary conveyor belt to move the primary conveyor belt according to an external drive force. An accumulation belt operates in a direction opposite to the primary conveyor belt.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a schematic diagram illustrating an exemplary aspect of the speed reduction mechanisms of the first and second drive belts;

FIG. 11 is a linear flow diagram illustrating a method for installing an accumulation module within a conveyor system.

DETAILED DESCRIPTION OF THE PREFERRED EMBODIMENTS

Figure 1:
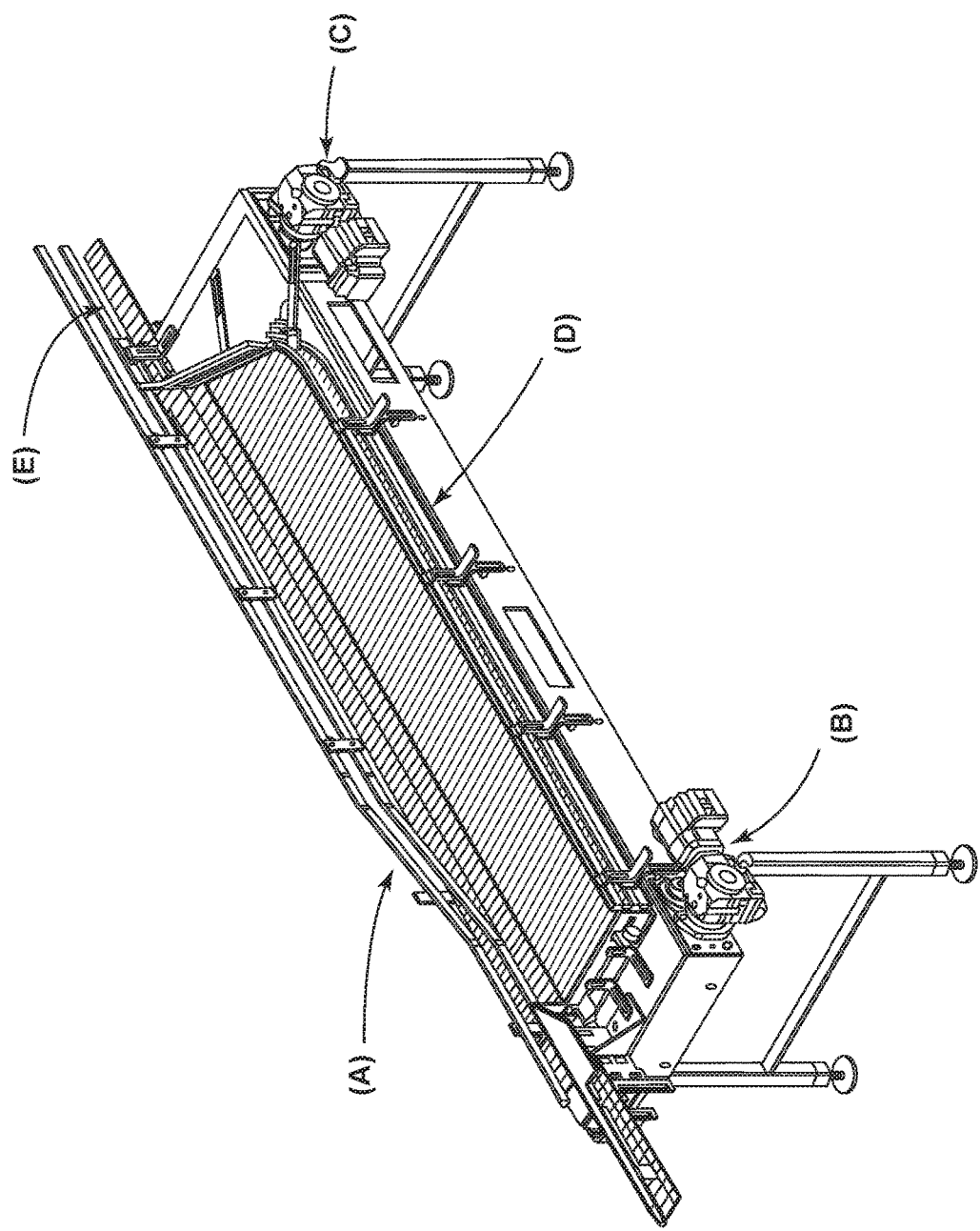
FIG. 1 is a top isometric view of a conveyor system incorporating a conventional prior art accumulation table that is attached to a conveyor system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 2-10, reference numeral 10 generally refers to an accumulation module that can be incorporated within a conveyor system 12 for moving products 14 from one location to another. The accumulation module 10 is typically utilized for providing an accumulation function within the conveyor system 12 for preventing blockages and product back-up within the conveyor system 12. Typically, the accumulation module 10 includes an accumulation belt 16 that operates in opposition to a conveyor belt 18, where the conveyor belt 18 is typically the primary mechanism for moving products 14 through the conveyor system 12. According to various aspects of the device, the accumulation module 10 for the conveyor system 12, such as a product delivery system, includes an input shaft 20 that is configured to receive an external drive force 22. The accumulation module 10 also includes a transfer shaft 24 that reverses the operation of the external drive force 22 to define the reversing drive force 26. An output shaft 28 of the accumulation module 10 receives the reversing drive force 26. The accumulation belt 16 is operated by the reversing drive force 26. The accumulation belt 16 operates in a reverse direction 30 that is in opposition to the delivery direction 32 of the conveyor belt 18. Typically, the primary conveyor belt 18 is operated by a motor 34 that provides the external drive force 22. This primary conveyor belt 18 is coupled to the input shaft 20 of the accumulation module 10. Accordingly, the external drive force 22 that is provided by the motor 34 for the conveyor system 12 transfers this external drive force 22 via the conveyor belt 18 and into the input shaft 20 of the accumulation module 10. Through this configuration, the accumulation module 10 is passively operated and does not include an internal motor 34 for operating the accumulation belt 16. Rather, the accumulation module 10 receives the external drive force 22 from a motor 34 that is positioned distal from the accumulation module 10, for operating a section of the conveyor belt 18 that is coupled with the accumulation module 10. This external drive force 22 is modulated by the transfer shaft 24 of the accumulation module 10 into the reverse direction 30 for operating the accumulation belt 16.

The accumulation module 10 receives the external drive force 22 from the primary conveyor belt 18, which engages the input shaft 20. Through this engagement, the external drive force 22 operates the input shaft 20 via operation of the primary conveyor belt 18. A first drive belt 50 extends between the input shaft 20 and the transfer shaft 24. A second drive belt 52 extends between the transfer shaft 24 and the output shaft 28. In this manner, the transfer shaft 24 receives the external drive force 22 via the input shaft 20 and also modifies the external drive force 22 into the reversing drive force 26. This reversing drive force 26 is then transmitted through the second drive belt 52 and to the output shaft 28 for operating the accumulation belt 16 of the accumulation module 10.

Figure 5:
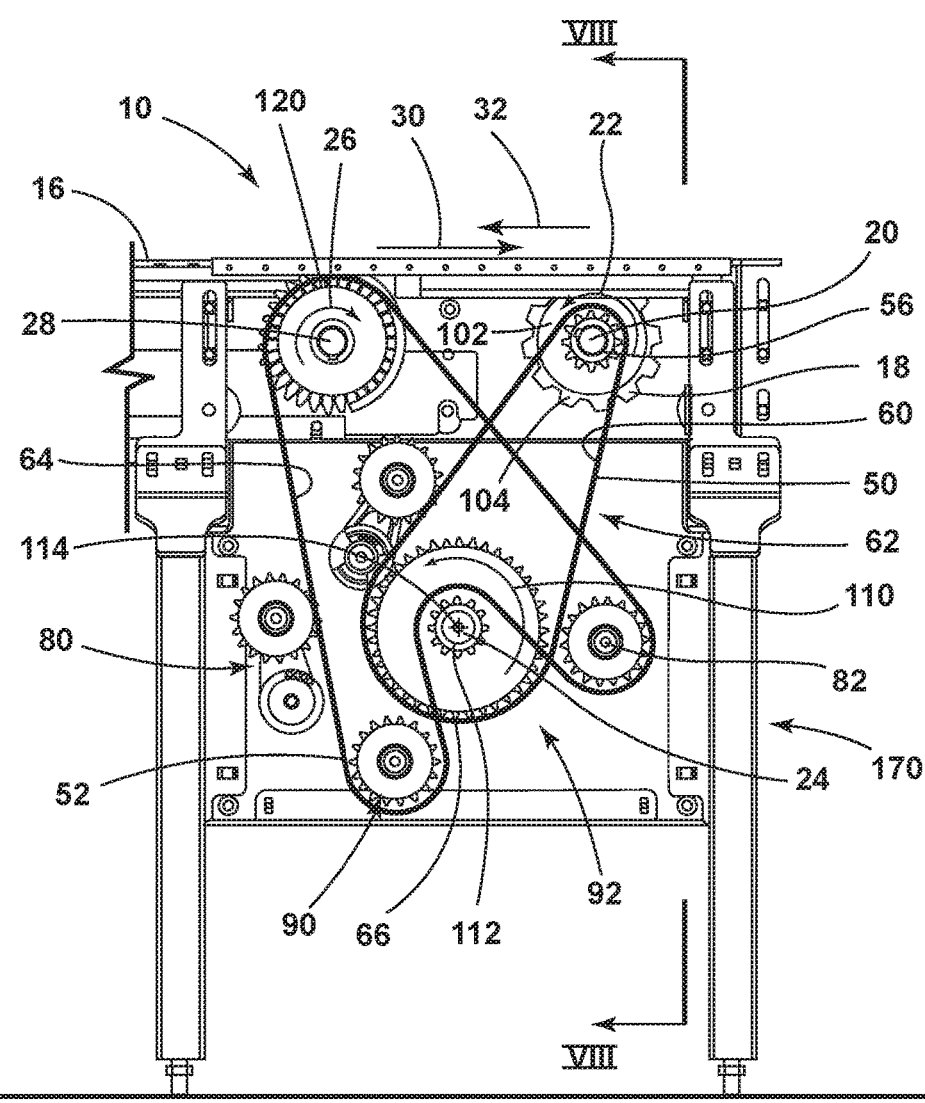
FIG. 5 is a side elevational view of the accumulation module of FIG. 4 taken at area V and with an outer cover removed to reveal the power transfer system of the accumulation module.
Figure 6:
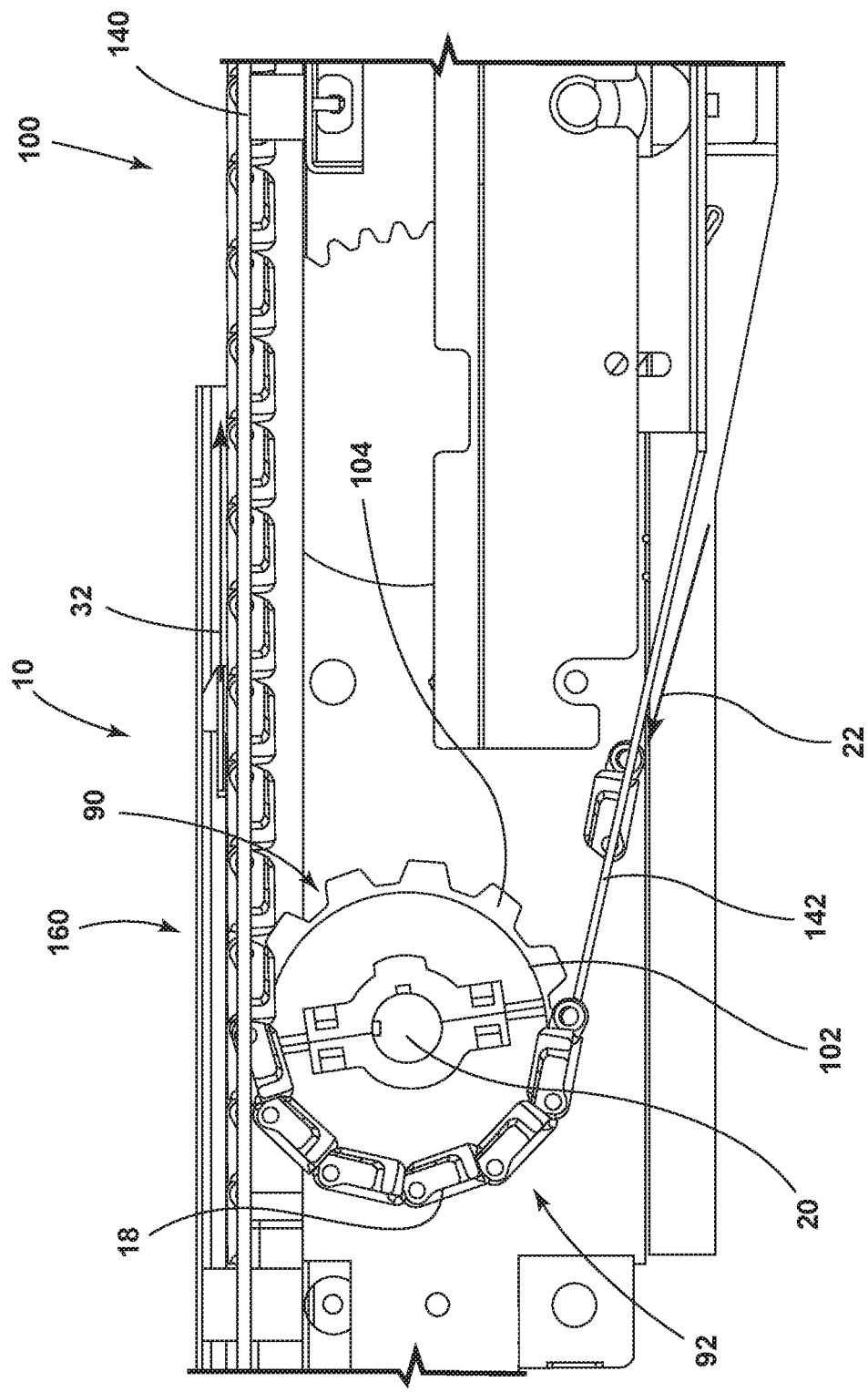
FIG. 6 is a side elevational view of an aspect of the accumulation module attached to the conveyor system.
Figure 8:
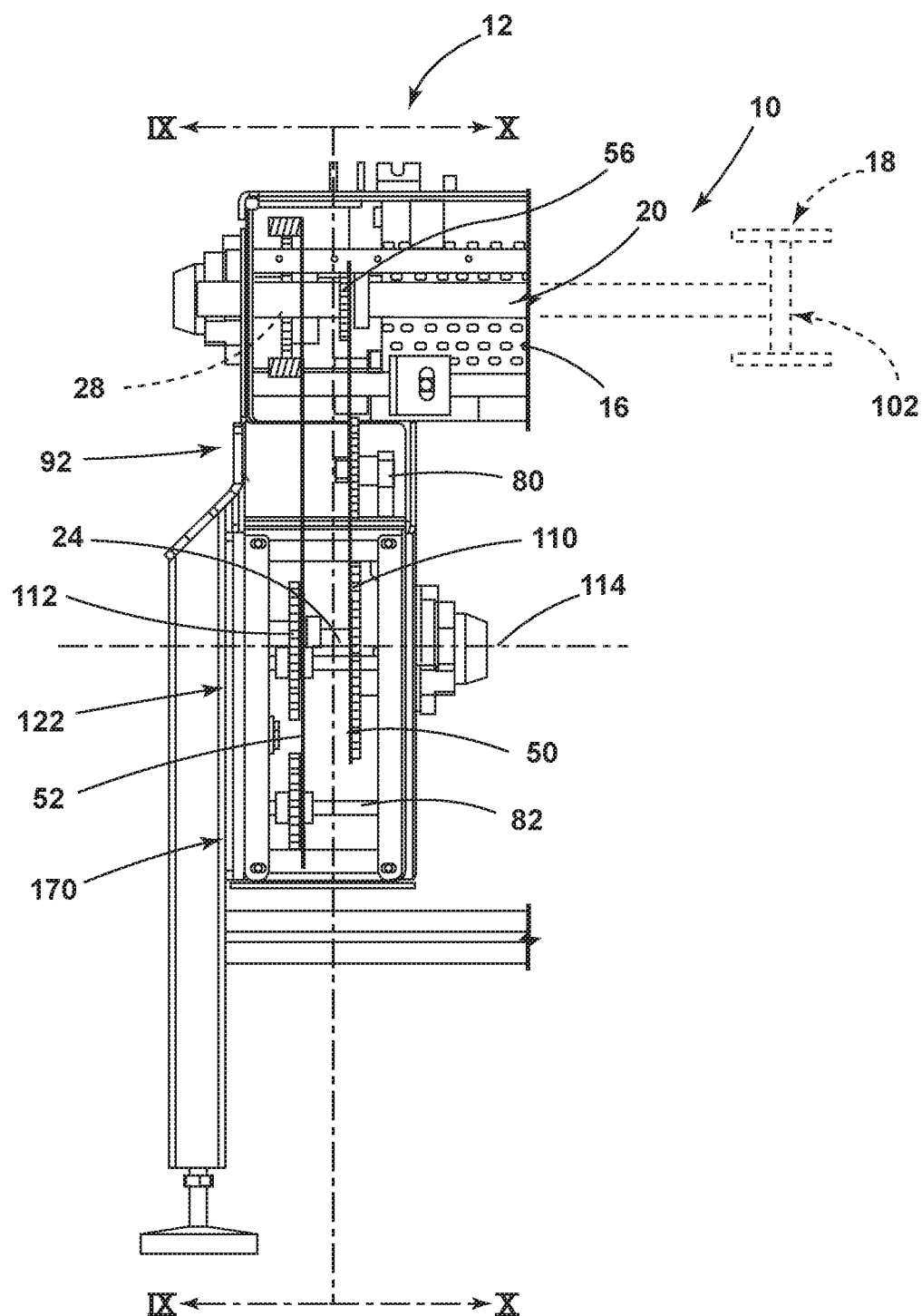
FIG. 8 is a cross-sectional view of the accumulation module of FIG. 5 taken along line VIII-VIII.
Figure 9:
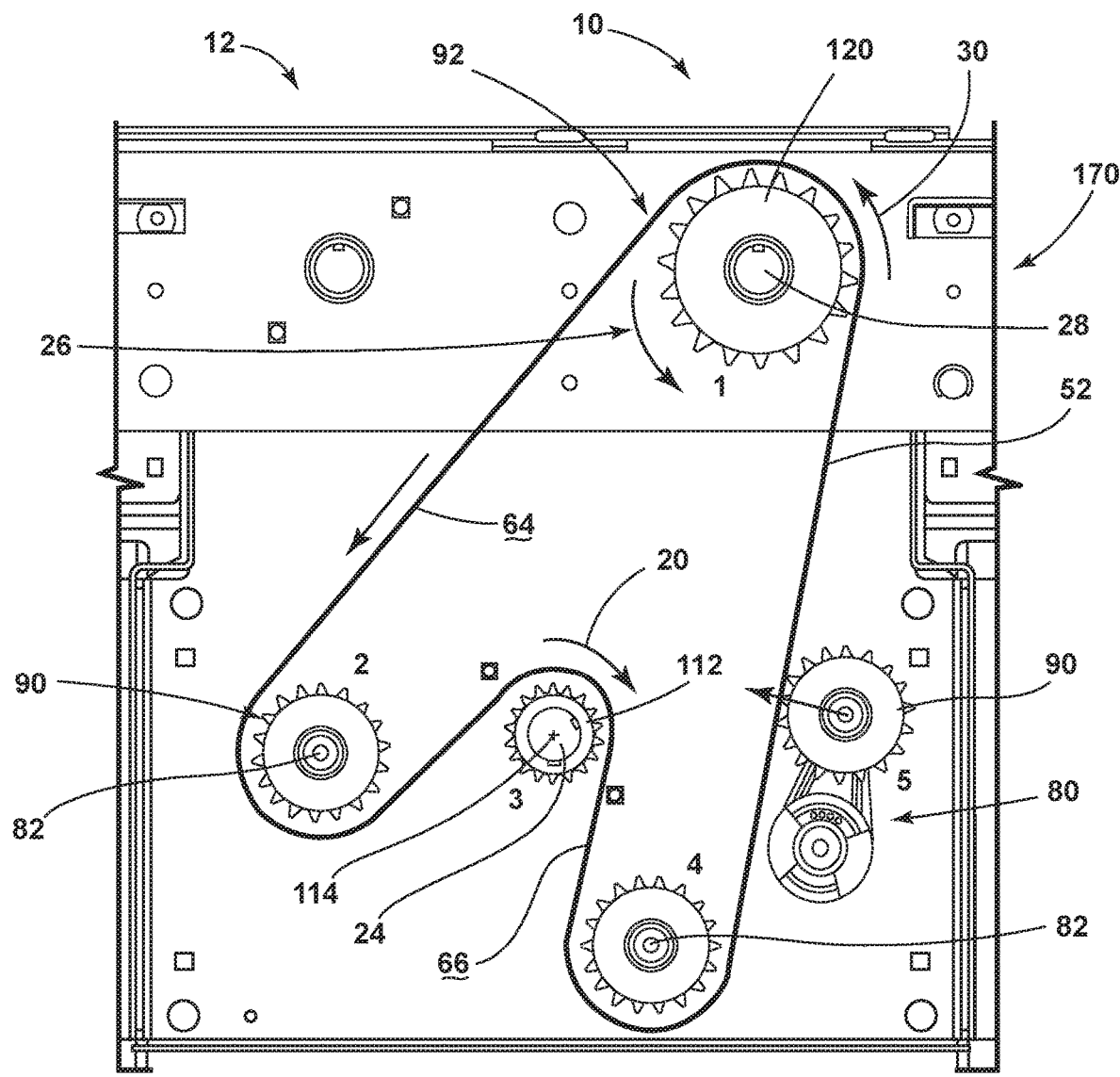
FIG. 9 is a cross-sectional view of the accumulation module of FIG. 8 taken along line IX-IX.
Figure 10:
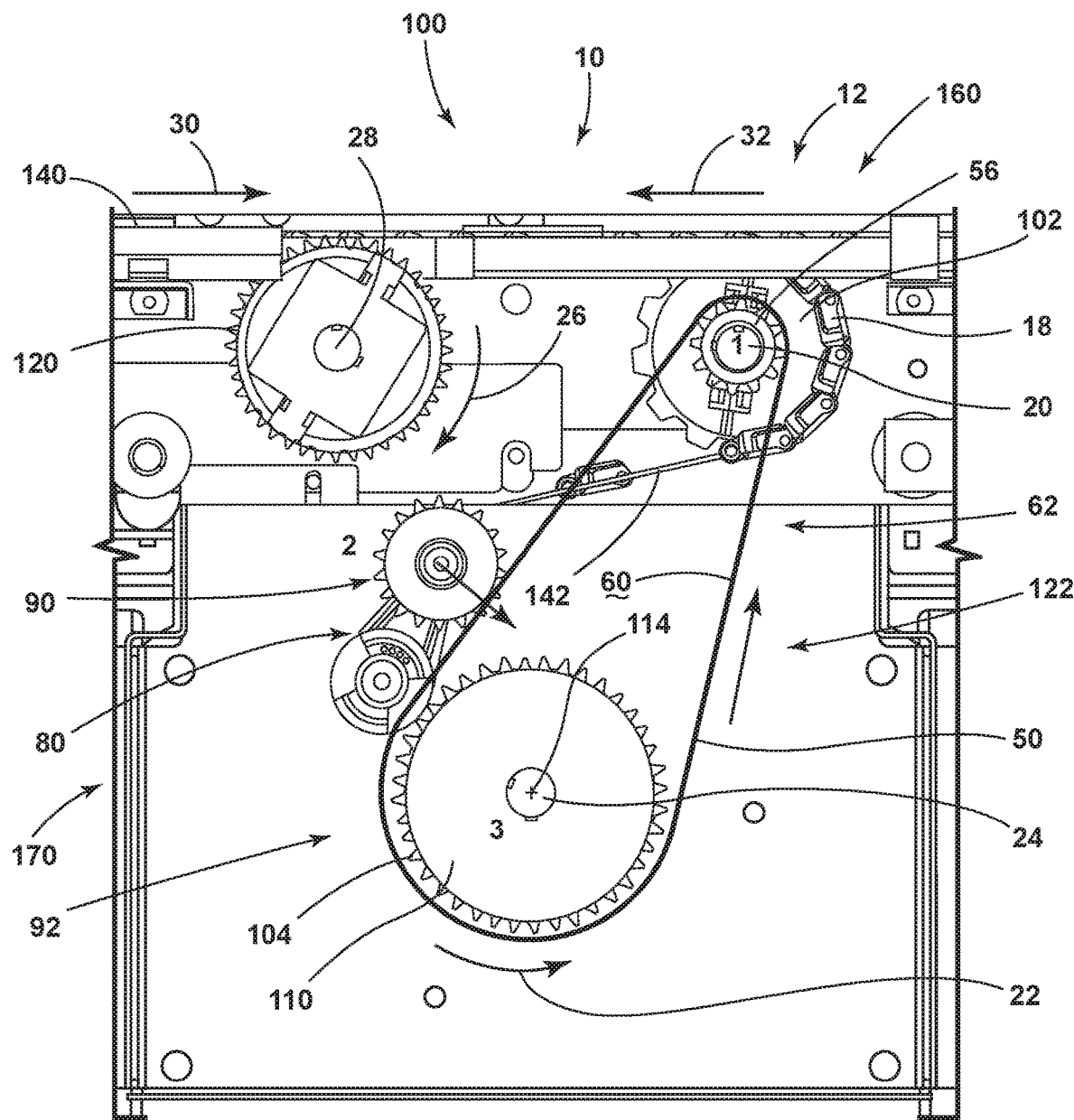
FIG. 10 is a cross-sectional view of the accumulation module of FIG. 8 taken along line X-X.

As exemplified in FIGS. 5 and 10, the first drive belt 50 is positioned on the input shaft 20 and the transfer shaft 24 in such a way that the inside surface 60 of the first drive belt 50 engages each of the input shaft 20 and the transfer shaft 24. Accordingly, the input shaft 20 and the transfer shaft 24 rotate in a common direction 62 through the engagement with the first drive belt 50. Conversely, as exemplified in FIGS. 5 and 9, the second drive belt 52 engages the output shaft 28 at an inward surface 64 of the second drive belt 52 and engages the transfer shaft 24 at an outside surface 66 of the second drive belt 52. Through this opposing engagement of the output shaft 28 and the transfer shaft 24 with respect to the inward and outside surfaces 64, 66 of the second drive belt 52, the direction of the external drive force 22 can be modulated to define the reversing drive force 26. Through this configuration, the rotation of the output shaft 28 is opposite to that of the transfer shaft 24 via operation of the second drive belt 52. It should be understood that the configurations of the first and second drive belts 50, 52 with respect to the transfer shaft 24 can be reversed.

As exemplified in FIGS. 5-10, various tensioners 80 and idler shafts 82 can be included within the accumulation module 10 for providing a proper amount of tension within the first and second drive belts 50, 52. The idler shafts 82 can also be used to position at least the second drive belt 52 to engage and directly contact the transfer shaft 24 through approximately 180° of rotation of the transfer shaft 24. This enlarged direct contact between the second drive belt 52 and the transfer shaft 24 provides for an additional amount of direct contact with the transfer shaft 24 that can engage and, in turn, drive the second drive belt 52 for operating the output shaft 28 and the accumulation belt 16. The amount of direct contact between the first and second drive belts 50, 52 and the transfer shaft 24 and the input and output shafts 20, 28 is configured to prevent slippage and skipping of the first and second drive belts 50, 52.

The first and second drive belts 50, 52 are described as engaging the input shaft 20, transfer shaft 24 and output shaft 28. It should be understood that the first and second drive belts 50, 52 are configured to engage sprockets 90, gears, or other similar frictional interface 92 that is defined within the input, transfer and output shafts 20, 24, 28. The nature of the frictional interface 92 typically cooperates with the first and second drive belts 50, 52. The first and second drive belts 50, 52 can be chains, belts, and other similar drive mechanisms.

As discussed previously, the input shaft 20 of the accumulation module 10 is driven by the external drive force 22 that is produced by a motor 34 of the primary conveyor belt 18. The motor 34 of the primary conveyor belt 18 is typically positioned distal from the accumulation module 10, such as at an opposing end of the particular delivery section 100 of the conveyor system 12. In order to transfer the external drive force 22 into the input shaft 20 of the accumulation module 10, the input shaft 20 typically includes a power take-off sprocket 102 that directly engages the primary conveyor belt 18 of the conveyor system 12. The primary conveyor belt 18 is positioned to engage the power take-off sprocket 102 through approximately 180° of the cogs 104 for the power take-off sprocket 102. To achieve this direct contact of approximately 180° around the power take-off sprocket 102, the primary conveyor belt 18 is tensioned within the accumulation module 10 to achieve this approximately 180° direct engagement. This engagement serves to spread the external drive force 22 over a greater number of cogs 104 (or teeth), thereby minimizing the load on any single cog 104. In turn, this configuration also minimizes the occurrence of jumping of the primary conveyor belt 18 with respect to the cogs 104 of the power take-off sprocket 102. Through the engagement between the primary conveyor belt 18 and the power take-off sprocket 102 for the input shaft 20, the external drive force 22 can be transferred from the primary conveyor belt 18 and into the accumulation module 10 for operating the accumulation belt 16 in the reverse direction 30 to that of the primary conveyor belt 18.

As exemplified in FIGS. 5-10, the sizing of the sprockets 90 and other components of the frictional interface 92 that are coupled to the input shaft 20, the output shaft 28 and the transfer shaft 24 can be utilized to determine the speed at which the accumulation belt 16 operates with respect to the primary conveyor belt 18. As exemplified in FIGS. 5, 9 and 10, the transfer shaft 24 includes a receiving sprocket 110 and a transfer sprocket 112 that are each attached to the transfer shaft 24 and operate about the transfer rotational axis 114. The first drive belt 50 extends between the input sprocket 56 and a receiving sprocket 110 of the transfer shaft 24. A transfer sprocket 112 that is coupled with the transfer shaft 24 engages with the outside surface 66 of the second drive belt 52 for transferring the reversing drive force 26 from the transfer shaft 24 to the output shaft 28. The sizes of the various sprockets 90 incorporated within the accumulation module 10 can be used as a modulating mechanism for determining the speed at which the accumulation belt 16 operates with respect to the primary conveyor belt 18.

In the exemplary embodiment illustrated in FIGS. 5, 7, 9 and 10, the input sprocket 56, or power take-off sprocket 102, that is coupled to the input shaft 20 can be smaller than the receiving sprocket 110 that is coupled with the transfer shaft 24. Additionally, the transfer sprocket 112 of the transfer shaft 24 can be smaller than the output sprocket 120 that is coupled to the output shaft 28. This difference is sizes can be manifested as a difference in diameter or circumference between the various sprockets 90 that engage the first and second drive belts 50, 52. Through this configuration, the various sprockets 90 define two speed reduction mechanisms 122 that slow the rate of speed of the accumulation belt 16 with respect to the primary conveyor belt 18. It should be understood that different sized sprockets 90 can be used to modulate the speed of the output sprocket 120 to produce faster or slower operation of the accumulation belt 16 with respect to the primary conveyor belt 18. Typically, the output sprocket 120 will be sized to have a smaller diameter and circumference to produce a reduced or slower speed of the accumulation belt 16 relative to the primary conveyor belt 18.

According to various aspects of the device, the speed of the output sprocket 120 and/or the receiving sprocket 110 is decreased through the speed reduction mechanism 122. This reduction in speed is accompanied by an increase in output torque for driving the accumulation belt 16 in the opposing direction of the external drive force 22. This increase in torque is useful in providing enough mechanical advantage to reverse the direction of the product 14 as the product 14 transitions from the primary conveyor belt 18 to the accumulation belt 16. The increase in torque can also be used to account for the oppositional friction forces within the system as the various sprockets 90 interact with the various belts and chains.

According to various aspects of the device, the increased torque provided to the output sprocket 120 serves to add only minimal amounts of strain on the motor 34 for the conveyor system 12. The speed reduction mechanisms 122 requires only a minimal amount of the input force from the motor 34 to drive the input sprocket 56. As this input force is transferred through the system, the speed is periodically decreased and the torque is, in turn, increased. The result is that only a small amount of force is required from the motor 34 for driving the accumulation module 10 such that the motor 34 will typically not need to be up-sized or replaced to provide greater amounts of torque. Accordingly, it is typical that the accumulation module 10 can be added as a retrofit or temporary component of an existing conveyor system 12. In addition, where the accumulation module 10 is installed or added, the motor 34 will not typically need to be changed or modified.

In addition, the gear reduction that is used within the speed reduction mechanism 122 is useful in reducing the load carried by the primary conveyor belt 18, as a result of driving the accumulation belt 16. By minimizing the additional torque and stress on the primary conveyor belt 18, the service life of the primary conveyor belt 18 can be extended by a significant margin. The use of the speed reduction mechanism 122 described herein also allows for the transfer of torque to the accumulation belt 16 to be provided by a single sprocket 90, in the form of the output sprocket 120. As an additional advantage of the speed reduction mechanism 122 described herein, the sizing of the sprockets 90 reduces the amount of horsepower needed to drive the accumulation belt 16. This diminished horsepower requirement is a result of the decreased speed and increased torque that is provided by the accumulation module 10. By diminishing the amount of additional horsepower needed in this regard, the size of the motor 34 for the conveyor system 12 does not need to be increased, or upsized. Accordingly, the motor 34 used in the conveyor system 12 and for powering the accumulation module 10 is of a size, or approximately of a size, that is generally typical for a conveyor system 12 that does not include the accumulation module 10. This use of a typically sized motor 34 for powering the primary conveyor belt 18 and the accumulation belt 16 also provides sufficient torque and horsepower to carry a significant amount of products 14 thereon.

By way of example and not limitation, the two speed reduction mechanisms 122 can provide any one of various gear ratios that produce a mechanical advantage for operating the accumulation module 10 without requiring a change in the size of the motor 34. In a non-limiting example reflected in FIG. 7, the total gear ratio between the input shaft 20 and the output shaft 28 can be a 6:1 ratio. This ratio can be produced by a 3:1 ratio between the power take-off sprocket 56 and the receiving sprocket 110 along with a 2:1 ratio between the transfer sprocket 112 and the output sprocket 120. As discussed above, each of the receiving sprocket 110 and the transfer sprocket 112 are positioned on the transfer shaft 24.

In certain aspects of the device, where the first and second drive belts 50, 52 are chains or belts that mesh with the sprockets 90, the various sprockets 90 will include similar spacing of the cogs 104 so that the cogs 104 of the sprockets 90 will mesh evenly and consistently during operation of the accumulation module 10. While the cogs 104 may have similar spacing, the number of cogs 104 on the various sprockets 90 differs. This difference in the number of cogs 104 or teeth produces the different gear ratios and the mechanical advantage produced through the accumulation module 10.

FIG. 7 reflects an exemplary and non-limiting aspect of these configurations of the cogs 104 (teeth) of the various sprockets 90 that produce a decrease in speed as well as an increase in torque at the output shaft 28 for driving the accumulation belt 16. As exemplified in FIG. 7, this configuration of the sprockets 90 can receive the primary conveyor belt 18 at the power take-off sprocket 56 at a speed of approximately 94.9 rpm. This rotational rate is reduced to approximately 31.6 rpm at the receiving sprocket 110. This rotational rate is reduced again between the transfer sprocket 112 to the output sprocket 120 to produce an output rotational rate of approximately 15.8 rpm. While this rotational rate, or speed, is reduced, the torque is increased. An output torque of approximately 17.72 lb-ft at the output sprocket 120 can be produced through an input torque of approximately 2.95 lb-ft at the power take-off sprocket 102. Again, the interaction of the various sprockets 90 and the configuration of the transfer shaft 24 allows for this increase in torque and decrease in speed between the input shaft 20 and the output shaft 28.

Figure 2:
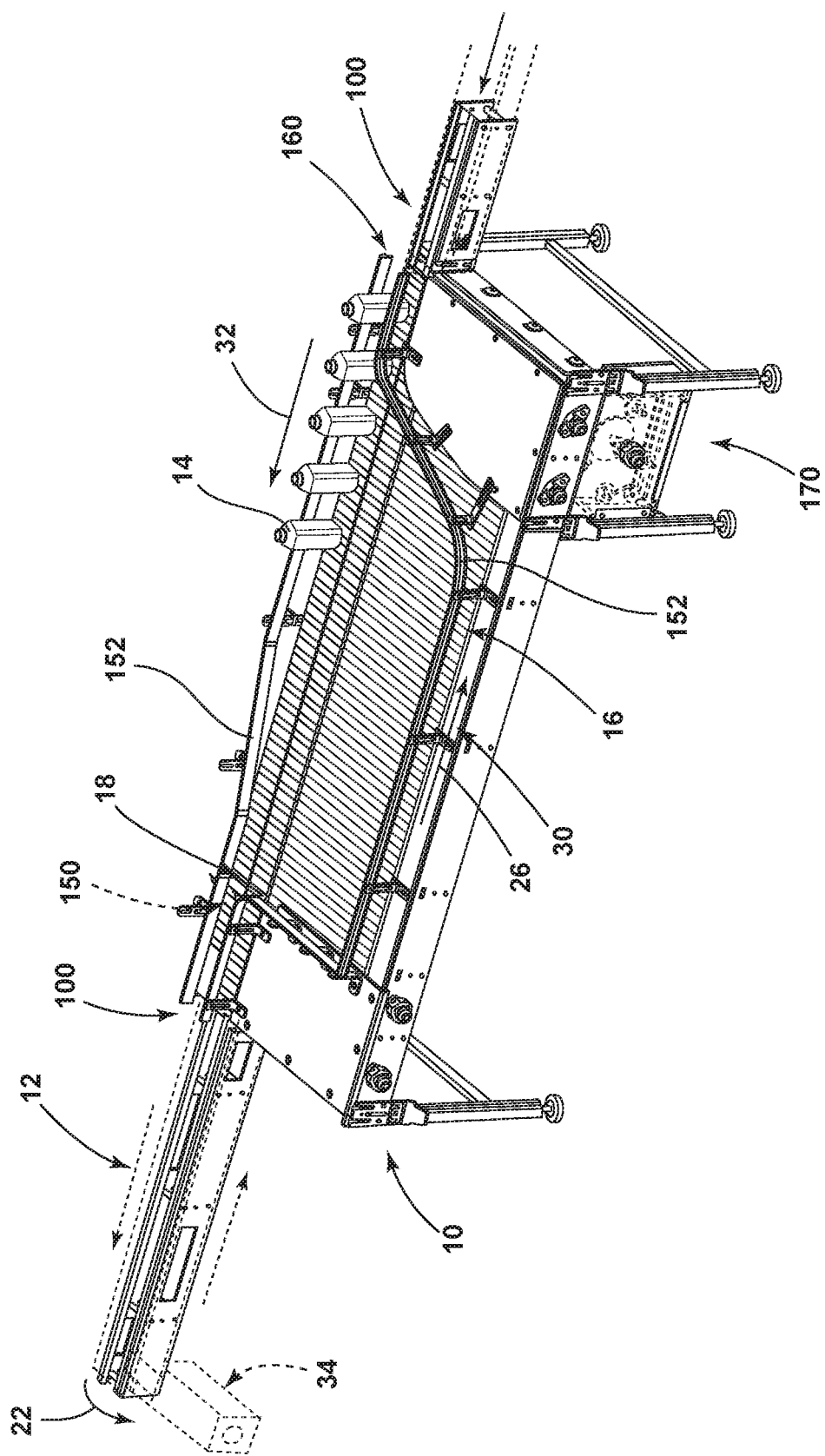
FIG. 2 is a top isometric view of an aspect of the accumulation module that is coupled with the conveyor system.
Figure 3:
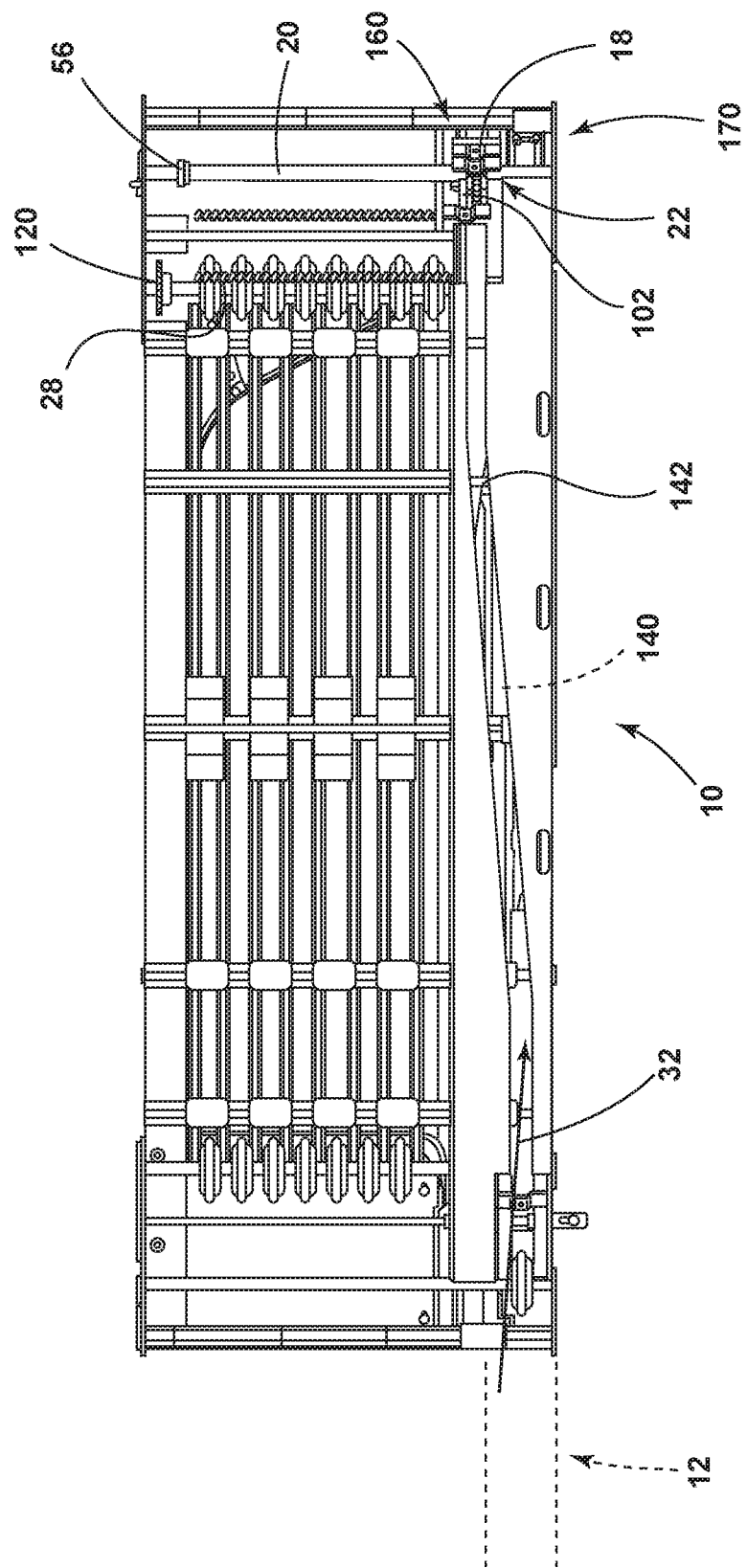
FIG. 3 is a bottom plan view of the accumulation module of FIG. 2 and showing engagement of the accumulation module with the powered conveyor system.
Figure 4:
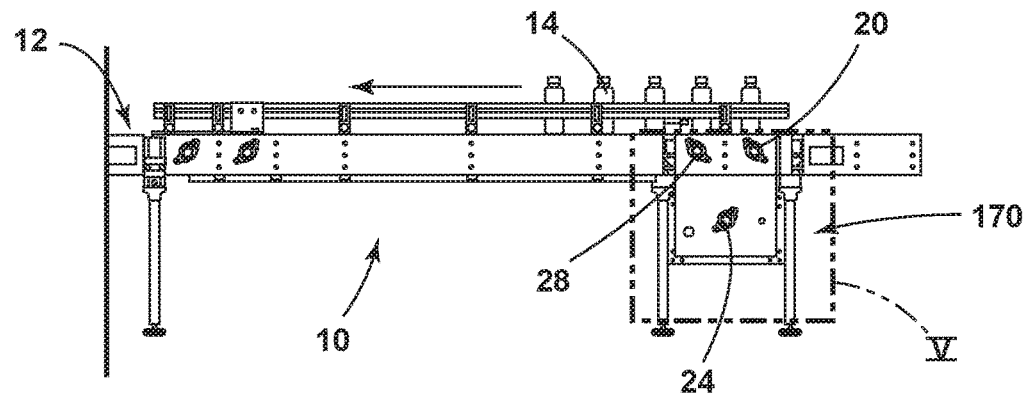
FIG. 4 is a partial side elevational view of an aspect of the accumulation module and showing the interface between the powered conveyor system and the accumulation module.

As exemplified in FIGS. 2-4, the primary conveyor belt 18 moves through the accumulation module 10 through a top side chain track 140 and a bottom side chain track 142. These top side and bottom side chain tracks 140, 142 serve to orient the positioning of the primary conveyor belt 18 to engage the power take-off sprocket 102 of the input shaft 20 to achieve the approximately 180° of direct contact between the chain links of the primary conveyor belt 18 and the cogs 104 of the power take-off sprocket 102. The direction of travel of the primary conveyor belt 18 through the accumulation module 10 can be in either direction depending upon the location of the accumulation module 10 within a particular delivery section 100 of the accumulation system and the path of travel of the products 14 through the conveyor system 12. Regardless of the direction of travel of the primary conveyor system 12, the transfer mechanism of the accumulation module 10 serves to reverse the direction of the driving force from the external drive force 22 to the reversing drive force 26.

As exemplified in FIGS. 5, 9 and 10, each of the first drive belt 50 and the second drive belt 52 can be tensioned through various tensioners 80 that maintain engagement between the first drive belt 50 with the respective sprockets 90 and the second drive belt 52 with the respective sprockets 90. Additionally, the second drive belt 52 can include two idler shafts 82, having sprockets 90 that position the second drive belt 52 around the transfer sprocket 112 that is coupled with the transfer shaft 24. The inclusion of the various idler shafts 82 serves to maximize the direct engagement between the second drive belt 52 and the cogs 104 of the transfer sprocket 112 of the transfer shaft 24 for modulating the external drive force 22 into the reversing drive force 26.

As shown in the prior art conveyor system of FIG. 1, a conventional accumulation table (A) includes a table top motor (B) and a mat top motor (C) that are engaged with the accumulation table (A) for driving the accumulating belt (D) in a direction opposite to that of the main conveyor belt (E). In this prior art configuration, a first motor (B) operates the main conveyor belt (E), and second motor (C) operates the accumulation table (A). The use of multiple motors provides for multiple maintenance points and multiple points of potential failure through the life of the conventional system.

Referring again to FIGS. 2-10, the use of the accumulation module 10 connects the accumulation module 10 with a single motor 34 for operating the primary conveyor belt 18. This single motor 34 of the primary conveyor belt 18 provides the external drive force 22 that operates the first drive belt 50 and also operates the accumulation module 10 and the accumulation belt 16 that is disposed therein.

Typically, an installed accumulation module 10 will not be required to modify operating speeds in relation to the speed of the primary conveyor belt 18. Accordingly, the size of the various sprockets 90 included within the accumulation module 10 can remain relatively consistent through the life of the conveyor system 12 and the accumulation module 10. Where a particular accumulation module 10 is retooled for use within a separate conveyor system 12, various sprockets 90 can be replaced for changing the relative speed of the accumulation belt 16 with respect to the primary conveyor belt 18.

In various aspects of the device, various gating systems 150 for the conveyor system 12 can be positioned separate from the accumulation module 10. Additionally, within and around the accumulation module 10, various rails 152 can be used to direct the products 14 from the accumulation belt 16 back onto the primary conveyor belt 18. Such gating structures and rails 152 are well known within the field of accumulation technologies and need not be described further.

During use, the installation of the accumulation module 10 can include positioning the accumulation module 10 at an intersection point between separate delivery sections 100 of the primary conveyor belt 18. At a first end 160 of a delivery section 100 of a primary conveyor belt 18, typically opposite to the motor 34 for the primary conveyor belt 18, the accumulation module 10 can be connected with the conveyor system 12. As discussed above, the primary conveyor belt 18 is coupled with the input shaft 20 at the power take-off sprocket 102. Through this configuration, the external drive force 22 of the motor 34 for the conveyor system 12 can be transferred into the input shaft 20 via the power take-off sprocket 102. The remainder of the accumulation module 10 can be positioned adjacent to the delivery section 100 of the primary conveyor belt 18. The accumulation module 10 can also include the top side chain track 140 and the bottom side chain track 142 within which portions of the primary conveyor belt 18 can be positioned for movement within and through the accumulation module 10. As discussed previously, the top side and bottom side chain tracks 140, 142 serve to position the primary conveyor belt 18 to achieve a sufficient wrapping of the primary conveyor belt 18 around the power take-off sprocket 102 to prevent jumping or skipping of the primary conveyor belt 18 with the cogs 104 of the power take-off sprocket 102.

Once the primary conveyor belt 18 is coupled with the power take-off sprocket 102 and the section of the primary conveyor belt 18 is positioned within the top side chain track 140 and the bottom side chain track 142, the motor 34 for the primary conveyor belt 18 can be activated. As discussed above, the external drive force 22 generated by the motor 34 for the primary conveyor belt 18 is transferred through the accumulation module 10 for operating the accumulation belt 16 in a reverse direction 30 to that of the primary conveyor belt 18. The external drive force 22 is transferred from the input shaft 20 and through the transfer shaft 24. The transfer shaft 24 modulates the external drive force 22 to define the reversing drive force 26. This reversing drive force 26 is then transferred from the transfer shaft 24 to the output shaft 28 and from the output shaft 28 into the accumulation belt 16 to define the operation of the accumulation belt 16 in the reverse direction 30.

The operation of the accumulation module 10 is a passive system in that the motor 34 of the primary conveyor belt 18 provides the sole external drive force 22 for operating at least the accumulation belt 16 of the accumulation module 10.

Referring now to FIGS. 2-11, having described various aspects of the accumulation module 10, a method 400 is disclosed for installing an accumulation module 10 within a delivery section 100 of a conveyor system 12. According to the method 400, step 402 includes positioning the accumulation module 10 within a desired location of the conveyor system 12. According to step 404, the primary conveyor belt 18 of the conveyor system 12 is disengaged from the conveyor system 12. Step 406 includes reattaching the primary conveyor belt 18 with the input shaft 20 via the top side chain track 140, bottom side chain track 142 and power take-off sprocket 102 of the accumulation module 10. As part of this step 406, the length of the primary conveyor belt 18 may need to be adjusted to accommodate installation of the accumulation module 10. In this manner, links of the primary conveyor belt 18 may need to be removed or added to accommodate any changes in length of the system or components of the system. Step 408 includes tensioning the primary conveyor belt 18 to achieve the desired wrapping of the primary conveyor belt 18 with the power take-off sprocket 102. According to step 410, the motor 34 for the primary conveyor belt 18 is activated and the primary conveyor belt 18 moves according to the external drive force 22. As discussed above, this external drive force 22 is transferred through the accumulation module 10 for operating the accumulation belt 16 in a direction opposite to that of the motion of the primary conveyor belt 18.

As exemplified in FIGS. 2-10, the various components of the accumulation module 10 can be positioned within a drive transfer housing 170. This drive transfer housing 170 can be a self-contained system that is used to modulate the external drive force 22 to the reversing drive force 26. Accordingly, the drive transfer housing 170 can be coupled with any one of several types of accumulation modules 10 that may have accumulation belts 16 in a wide range of sizes. According to various aspects of the device, the drive transfer housing 170 can be utilized as a retrofit component for placement on a conventional accumulation table (A). In such an embodiment, the drive transfer housing 170 can take the place of the one or more accumulation motors 34 that are used to drive the conventional accumulation table (A), as exemplified in the prior art device of FIG. 1. Alternatively, the drive transfer housing 170 can be manufactured as a new component along with an accumulation module 10 for installation within a wide range of conveyor systems 12.

The accumulation module 10 can be used within conveyor systems 12 that are used for bottling operations, food-grade operations, box-delivery operations and other similar conveying operations where an accumulation system may be utilized.

The use of the accumulation module 10 serves to limit the number of motors 34 utilized within a product conveyor system 12. The accumulation module 10 also serves to minimize the number of maintenance points, in particular motor-maintenance points, within a conveyor system 12. By passively operating the accumulation module 10, the energy and resources used within the accumulation system is also minimized by operating fewer motors 34 when compared with a conventional accumulation table. The accumulation module 10 is also configured to be conveniently installable within a product conveyor system 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An accumulation module for a product delivery system, the accumulation module comprising:
    an input shaft configured to receive an external drive force;
    a transfer shaft that receives the external drive force from the input shaft, the transfer shaft engaging a transmitting member that reverses an operation of the external drive force to define a reversing drive force;
    an output shaft that receives the reversing drive force from the transfer shaft via the transmitting member; and
    an accumulation belt that is operated by the reversing drive force, wherein the accumulation belt operates in opposition to the external drive force.

2. The accumulation module of claim 1, wherein a first drive belt extends between the input shaft and the transfer shaft.

3. The accumulation module of claim 2, wherein a second drive belt extends between the transfer shaft and the output shaft to define the transmitting member.

4. The accumulation module of claim 3, wherein the input shaft, output shaft, transfer shaft and the first and second drive belts are disposed within a drive transfer housing.

5. The accumulation module of claim 1, wherein the external drive force is configured to be provided by a motor for a conveyor system.

6. The accumulation module of claim 4, wherein the transfer shaft includes a receiving sprocket that is attached to the first drive belt and a transfer sprocket that is attached to the second drive belt.

7. The accumulation module of claim 6, wherein the receiving sprocket and the transfer sprocket define a speed reduction mechanism.

8. The accumulation module of claim 7, wherein the receiving sprocket has a greater circumference than a circumference of the transfer sprocket.

9. The accumulation module of claim 4, wherein the output shaft includes an output sprocket that engages the accumulation belt.

10. The accumulation module of claim 9, wherein the input shaft includes an input sprocket that is configured to engage a primary conveyor belt of a conveyor system.

11. A passively-operated accumulation module for a product delivery system, the passively-operated accumulation module comprising:
    an input shaft configured to receive an external drive force from a motor that drives a primary conveyor belt;
    a transfer shaft that reverses operation of the external drive force to define a reversing drive force, wherein a first belt extends around the input shaft and the transfer shaft;
    an output shaft that receives the reversing drive force, wherein a second belt extends around the transfer shaft and the output shaft to define a transmitting member that modifies the external drive force into the reversing drive force; and
    an accumulation belt that is operated by the reversing drive force of the output shaft, wherein the accumulation belt operates in opposition to the external drive force.

12. The accumulation module of claim 11, wherein the transfer shaft includes a receiving sprocket that is attached to the first belt and a transfer sprocket that is attached to the second belt, wherein the transfer sprocket defines a portion of the transmitting member.

13. The accumulation module of claim 12, wherein the receiving sprocket and the transfer sprocket define a speed reduction mechanism.

14. The accumulation module of claim 13, wherein the transfer sprocket has a smaller circumference than a circumference of the receiving sprocket.

15. The accumulation module of claim 11, wherein the output shaft includes an output sprocket that engages the accumulation belt.

16. The accumulation module of claim 15, wherein the input shaft includes an input sprocket that is configured to engage the primary conveyor belt of the product delivery system.

17. The accumulation module of claim 11, further comprising:
    a gating system that directs product between the primary conveyor belt to the accumulation belt.

18. The accumulation module of claim 17, wherein the gating system is coupled with the primary conveyor belt.

19. A method for attaching a passively-operated accumulation module to a product delivery system, the method comprising steps of:
    positioning the accumulation module relative to a conveyor system;

disengaging a primary conveyor belt of the conveyor system;

attaching the primary conveyor belt to an input shaft of an accumulation module;

tensioning the primary conveyor belt to achieve the desired wrapping of the primary conveyor belt with a power take-off sprocket of the accumulation module; and activating a motor of the primary conveyor belt to move the primary conveyor belt according to an external drive force, wherein an accumulation belt operates in a direction opposite to the primary conveyor belt.

20. The method of claim 19, wherein the primary conveyor belt and the accumulation belt are coupled to one another at a transfer shaft of the accumulation module.

* * * * *